(No Model.) 7 Sheets—Sheet 1.

J. R. JONES.
ROLLING MILL.

No. 573,000. Patented Dec. 15, 1896.

WITNESSES:
L. Douville.
O. F. Eagle.

INVENTOR
John R. Jones
BY
Joshua Biedersheim
ATTORNEY.

THE NORRIS PETERS CO., PHOTO-LITHO., WASHINGTON, D. C.

(No Model.) 7 Sheets—Sheet 3.

J. R. JONES.
ROLLING MILL.

No. 573,000. Patented Dec. 15, 1896.

WITNESSES:
L. Douville,
O. H. Eagle

INVENTOR
John R. Jones.
BY
Joshua Biedersheim
ATTORNEY.

(No Model.)   J. R. JONES.   7 Sheets—Sheet 4.
ROLLING MILL.

No. 573,000.   Patented Dec. 15, 1896.

fig. 11.

After passing through grooves 58 and 60 in rolls 56 and 62.

fig. 14.

After passing through grooves 80 and 83 in rolls 78 and 82.

fig. 17.

After passing through grooves 59 and 61 in rolls 56 and 62.

fig. 12.

After passing through grooves 11 and 28 in rolls 10 and 27.

fig. 15.

After passing through grooves 16 and 18 in rolls 14 and 20.

fig. 18.

After passing through grooves 12 and 29 in rolls 10 and 27.

fig. 13.

After passing through grooves 93 and 95 in rolls 91 and 97.

fig. 16.

After passing through grooves 43 and 45 in rolls 41 and 47.

fig. 19.

After passing through grooves 94 and 96 in rolls 91 and 97.

fig. 20.

After passing through grooves 81 and 84 in rolls 78 and 82.

fig. 21.

After passing through grooves 17 and 19 in rolls 14 and 20.

fig. 22.

After passing through grooves 44 and 46 in rolls 41 and 47.

WITNESSES:
L. Douville
O. F. Cagle

INVENTOR
John R. Jones
BY John W. Biedersteien
ATTORNEY.

(No Model.) 7 Sheets—Sheet 6.

J. R. JONES.
ROLLING MILL.

No. 573,000. Patented Dec. 15, 1896.

WITNESSES:
L. Douville,
P. H. Nagle.

INVENTOR
John R. Jones
BY
ATTORNEY.

(No Model.)

J. R. JONES.
ROLLING MILL.

Patented Dec. 15, 1896.

WITNESSES:
L. Douville,
P. B. Nagle

INVENTOR
John R. Jones
BY John W. Niederlein
ATTORNEY.

THE NORRIS PETERS CO., PHOTO-LITHO., WASHINGTON, D. C.

UNITED STATES PATENT OFFICE.

JOHN R. JONES, OF PHILADELPHIA, PENNSYLVANIA.

ROLLING-MILL.

SPECIFICATION forming part of Letters Patent No. 573,000, dated December 15, 1896.

Application filed June 29, 1896. Serial No. 597,357. (No model.)

*To all whom it may concern:*

Be it known that I, JOHN R. JONES, a citizen of the United States, residing in the city and county of Philadelphia, State of Pennsylvania, have invented a new and useful Improvement in Rolling-Mills, which improvement is fully set forth in the following specification.

My invention consists of a novel construction of rolling-mill in which space is economized and the gearing or other power-transmission devices employed are so arranged and assembled with respect to each other that a maximum degree of efficiency is obtained with a minimum expenditure of power, provision being made for rolling and reducing each billet successively without causing the attendants to travel over a large extent of space.

It further consists of novel details of construction, all as will be hereinafter set forth, and specifically pointed out in the claims.

Similar letters of reference indicate corresponding parts in the several figures.

Figure 1:
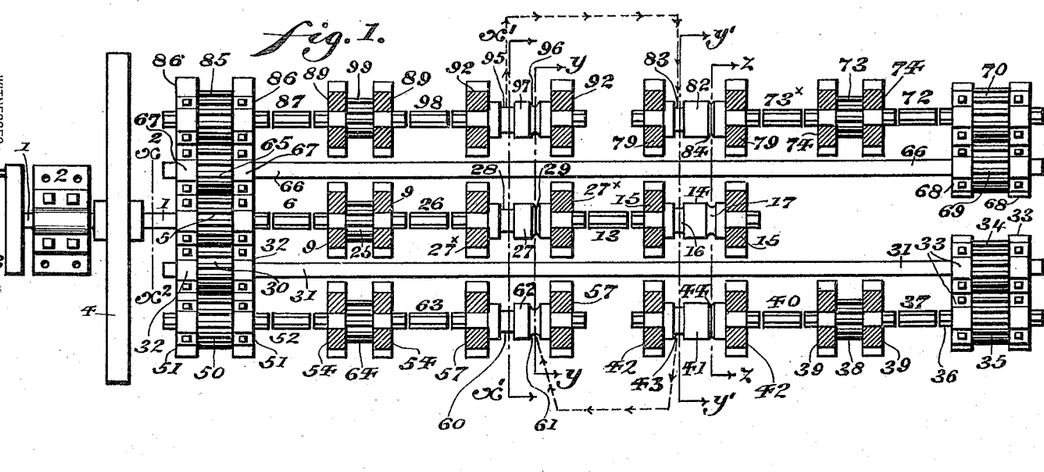
Figure 1 represents a plan view of a rolling-mill embodying my invention, a portion of the housing employed being shown in section on line $xx$, Fig. 2.

Referring to the drawings, reference being first had to Fig. 1, 1 designates a main shaft, which is mounted in suitable bearings 2, and has a crank-disk 3 attached thereto, to which power may be applied in the usual manner, said main shaft being also provided with a balance-wheel 4.

5 designates a gear mounted on said main shaft, which revolves in suitable housings and is connected, by means of the couplings 6 of any preferred construction, to the shaft 7, which has mounted thereon the gear 8, the same revolving in the housings 9.

Figure 3:
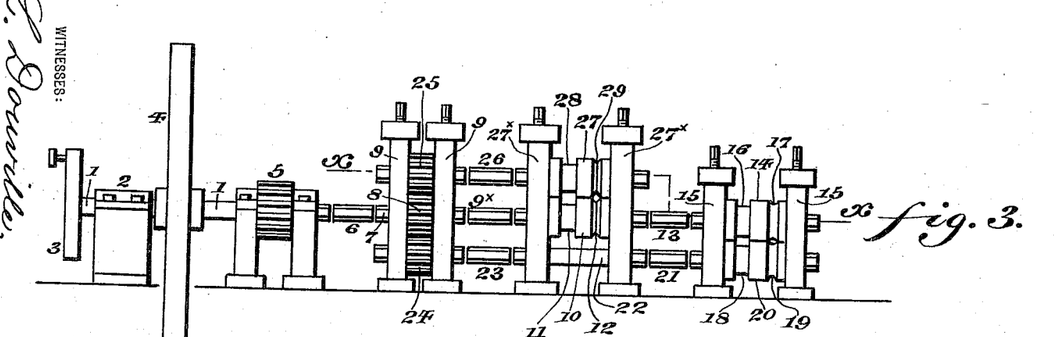
Fig. 3 represents a side elevation of the middle or intermediate mechanism of the mill seen in Fig. 1.

$9^\times$ designates a suitable coupling by means of which power is transmitted to the roll 10, which has its bearings in the housings $27^\times$, said rolls 10 being provided with channels or grooves 11 and 12, as will be evident from Fig. 3.

13 designates a suitable coupling by means of which power is transmitted from the shafts 1 and 7 to the roll 14, which has its bearings in the housings 15, said roll being provided with the channels or grooves 16 and 17.

20 designates a roll adjacent the roll 14, which has its bearings in the housings 15 and is provided with the grooves 18 and 19, which are in alinement with the grooves 16 and 17 of the roll 14.

21 designates a coupling through which power is transmitted to the roll 20 by the shaft 22 and the coupling 23, which latter is actuated by the gear 24, which is mounted in the housings 9, as seen in Fig. 3.

25 designates a gear, which is also mounted in the housings 9, from which by means of the coupling 26 power is transmitted to the roll 27, which is provided with the grooves 28 and 29, which are in alinement with the grooves 11 and 12 of the roll 10, it thus being evident from Fig. 3 that power is transmitted from the gear 8 to the gears 25 and 24 and thence to the rolls 27 and 20, whereby each set of rolls revolves in opposite directions, rolls 27 and 20 revolving around their axes in the same directions, while the peripheries of rolls 10 and 27 and rolls 14 and 20, which face each other, revolve in the opposite direction.

Referring now to Figs. 1, 5, and 6, 30 designates a gear which is in mesh with the gear 5 and is mounted on the shaft 31, which has its bearings in the housings 32 and 33.

34 designates a gear mounted on the shaft 31, which is in mesh with the gear 35, which is mounted on the shaft 36, which has its bearings also in the housings 33.

37 designates a coupling by means of which power is transmitted from the shaft 36 to the gear 38, which has its bearings in the housings 39, power being transmitted, by means of the couplings 40, from said gear 38 to the roll 41, which has its bearings in the housings 42.

43 and 44 designate grooves or channels in the roll 41, which are in alinement with the grooves 45 and 46 of the adjacent roll 47, which also has its bearings in the housings 42.

Figure 2:
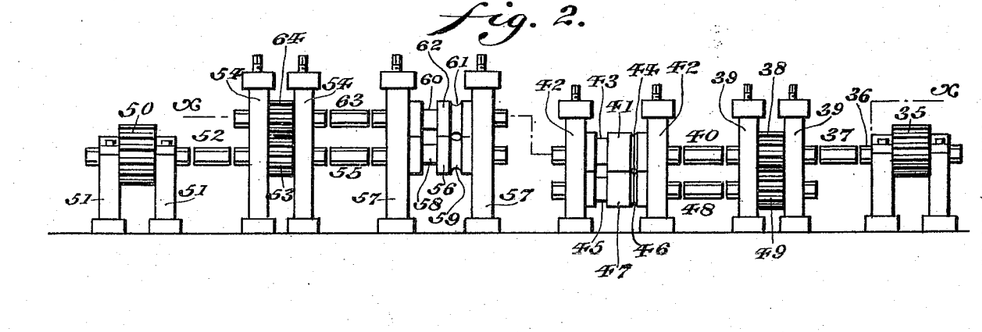
Fig. 2 represents a side elevation of the front of Fig. 1.

48 designates a coupling by means of which power is transmitted from the gear 49 to said roll 47, the gears 38 and 49 being in mesh, as will be understood from Fig. 2.

50 designates a gear which is in mesh with the gear 30 and has its bearings in the housings 51, from which power is transmitted, by means of the coupling 52, to the gear 53, which has its bearings in the housings 54, power being transmitted, by means of the coupling 55, to the roll 56, which has its bearings in the housings 57.

58 and 59 designate grooves or channels in the roll 56, which are in alinement with the grooves or channels 60 and 61, respectively, in the roll 62, which latter has its bearings in the housings 57.

63 designates a coupling by means of which power is transmitted from the gear 64 to the roll 62, it being evident from Figs. 1 and 2 that power is transmitted, by means of the gears 30 and 50 and the intermediate mechanism, to the rolls 41 and 47, also to the rolls 62 and 56.

Figure 5:
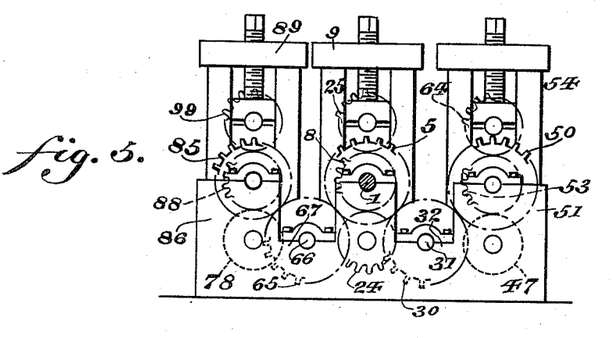
Fig. 5 represents a section on line $x^2 x^2$, Fig. 1.
Figure 6:
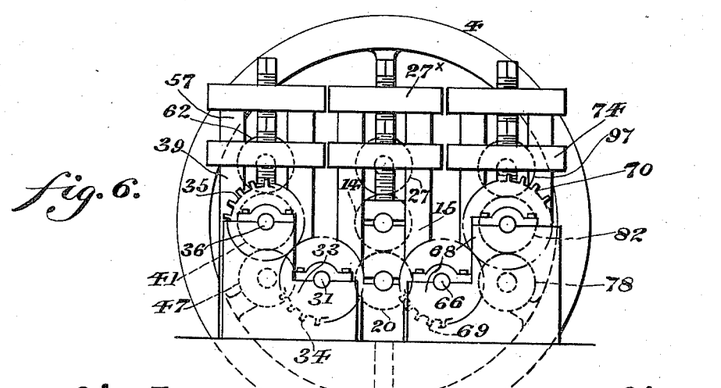
Fig. 6 represents an end elevation of Fig. 1.

65 designates a gear which is in mesh with the gear 5 and is mounted on the shaft 66, as seen in Figs. 5 and 6, said shaft having its bearings in the housings 67 and 68.

69 designates a gear mounted on said shaft 66, which is in mesh with the gear 70, which has its bearings in the housings 68.

Figure 4:
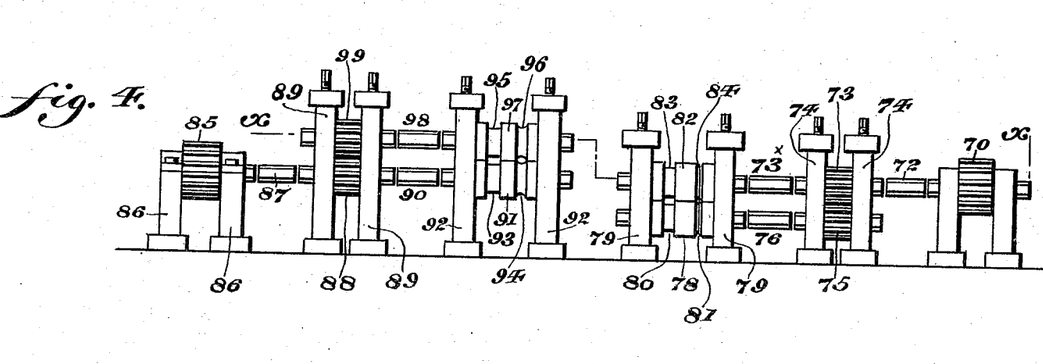
Fig. 4 represents an elevation of the rear of the mill seen in Fig. 1.

72 designates a coupling by means of which power is transmitted from the gear 70 to the gear 73, which has its bearings in the housings 74, reference being had to Figs. 1 and 4, power being transmitted to the gear 75, which is mounted adjacent thereto, and thence by means of the coupling 76 to the roll 78, which has its bearings in the housings 79.

80 and 81 designate grooves or channels in said roll 78, which are in alinement with the grooves or channels 83 and 84, respectively, of the roll 82, which is mounted in the housings 79, power being transmitted to the roll 82 from the gear 73 by means of the coupling $73^\times$.

85 designates a gear which is in mesh with the gear 65, as seen in Figs. 1, 4, and 5, said gear 85 being mounted on the housings 86 and power being transmitted therefrom by means of the coupling 87 to the gear 88, which has its bearings in the housings 89, as will be understood from said Fig. 4.

90 designates a coupling by means of which power is transmitted from the gear 88 to the roll 91, which has its bearings in the housings 92.

93 and 94 designate grooves or channels which are located in the roll 91 and are in alinement with the grooves 95 and 96 of the adjacent roll 97, which has its bearings in the housings 92.

98 designates a coupling by means of which power is transmitted from the gear 99 to the roll 97.

The numerals 100 to 111, inclusive, designate the different shapes which the billet is caused to assume from the first pass to the finished product, as will be understood from Figs. 11 to 22, inclusive, the finished product being seen in said latter figure.

Figures 7, 8, 9, 10:
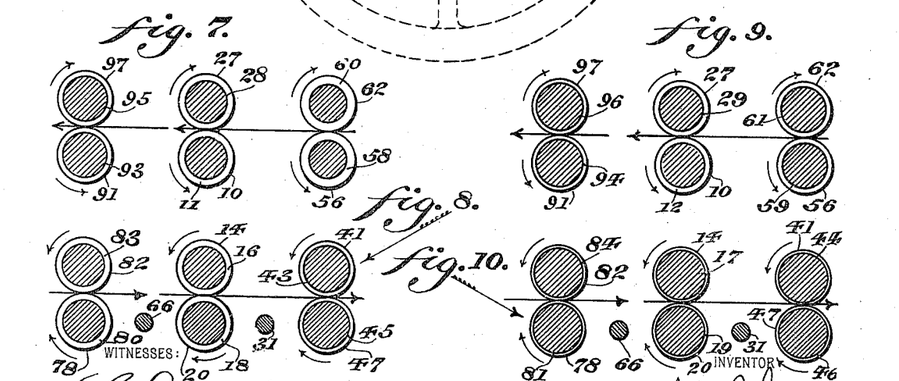
Fig. 7 represents a section on line $x' x'$, Fig. 1, showing the direction of rotation of the rolls and the initial passage of the billet therethrough.
Fig. 8 represents a section on line $y' y'$, Fig. 1, showing the direction of rotation of the rolls and the path of the billet on its return.
Fig. 9 represents a section on line $y y$, Fig. 1.
Fig. 10 represents a section on line $z z$, Fig. 1, showing the direction of rotation of the rolls and the travel of the billet during its final pass.
Figure 11:
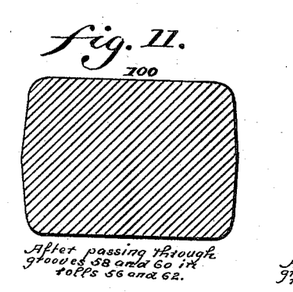
Figs. 11 to 22, inclusive, represent the successive shapes the billet is caused to assume after each pass through the rolls in the direction indicated in Figs. 7 to 10, inclusive.
Figure 12:
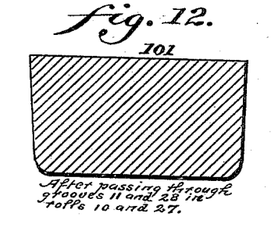
Figure 13:
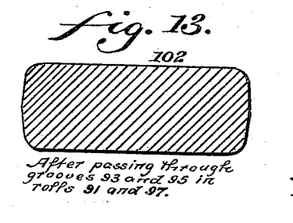
Figures 14, 17:
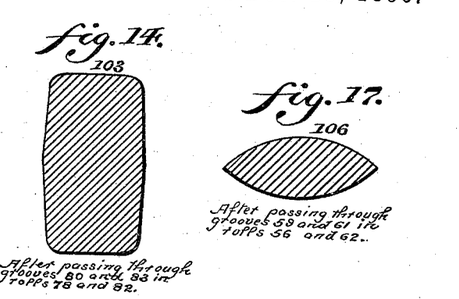
Figure 15:
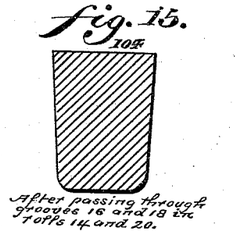
Figure 16:
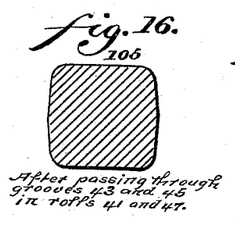
Figure 18:
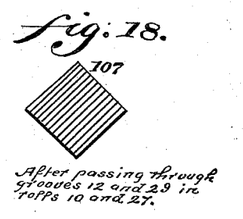
Figure 19:
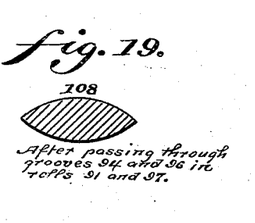
Figure 20:
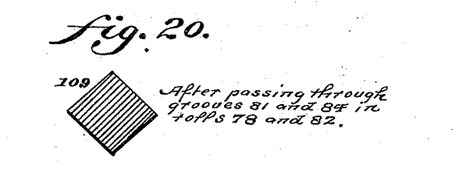
Figure 21:
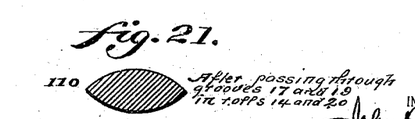

The operation is as follows: By following out the direction of rotation of the train of gearing indicated in Figs. 1 to 6, inclusive, it will be seen that the several rolls will be caused to rotate in the direction indicated by the arrows in Figs. 7 to 10, inclusive, the billet being first passed between the grooves 60 and 58 of the rolls 62 56, thence on between the grooves 28 and 11 of the rolls 27 and 10, and thence through the grooves 95 and 93 of the rolls 97 and 91. The billet is then transferred in the direction indicated by the arrow at the top of Fig. 1 to the grooves 83 and 80 of the rolls 82 and 78, and is passed thence between the grooves 16 and 18 of the rolls 14 and 20, and thence through the grooves 43 and 45 of the rolls 41 and 47, after which it is transferred in the direction indicated by the arrow at the bottom of Fig. 1 into the grooves 61 and 59 of the rolls 62 and 56, as indicated at the right of Fig. 9, the billet passing between the grooves 29 and 12 of the rolls 27 and 10 to the grooves 96 and 94 of the rolls 97 and 91, and being thence transferred to the space between the grooves 84 and 81 of the rolls 82 and 78, as seen in Fig. 4 and at the left of Fig. 10, the billet passing thence in the direction indicated by the arrows between the grooves 17 and 19 of the rolls 14 and 20 and the grooves 44 and 46 of rolls 41 and 47, as seen in Fig. 2 and at the right of Fig. 10, after which latter pass it assumes the shape of the finished product 111. (Seen in Fig. 22.)

Figure 22:
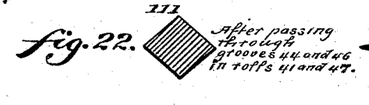

It will thus be apparent that by assembling the rolls in the manner described the passage or reduction of the billet from the blank to the finished product, as seen in Fig. 22, is effected in a most expeditious manner, as will be clearly understood from Figs. 1 and 7, it being of course understood that the speed of rotation of the different rolls is varied according to requirements as the cross-sectional area of the billet decreases during and after each pass.

The construction and manner of assembling the rolling-mill seen in Figs. 23 to 29, inclusive, and the path of the billet through the rolls are substantially identical with that already described with reference to the other figures of the drawings, the only material difference being in the application of and the transmission of power from the main shaft to the various other rolls of the mill.

Figure 23:
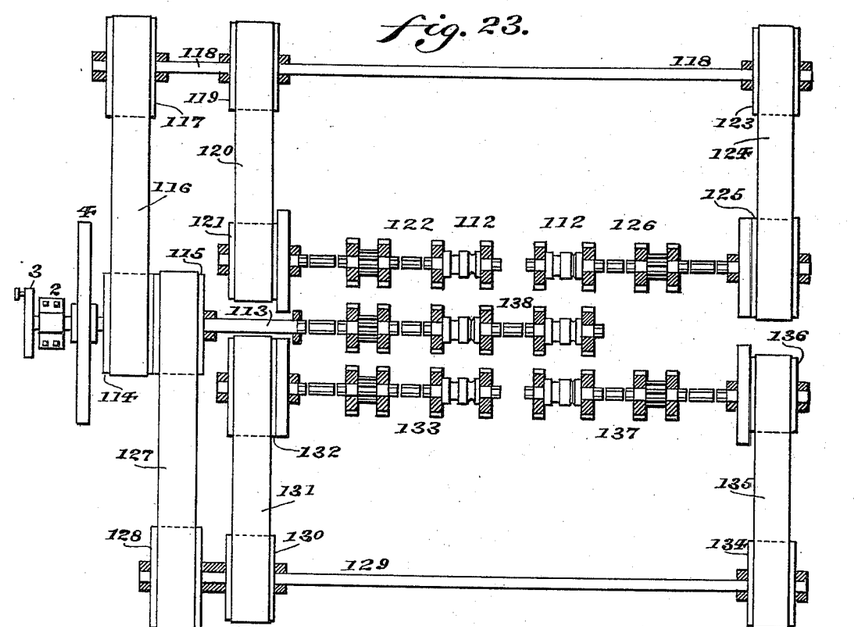
Fig. 23 represents a plan view of the rolling-mill in which the same apparatus is employed with belts used as the actuating means instead of gearing.
Figure 24:
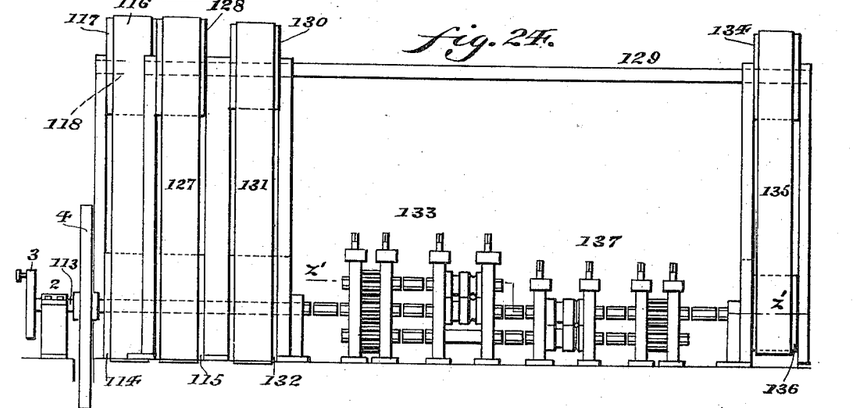
Fig. 24 represents a side elevation of Fig. 23.
Figure 25:
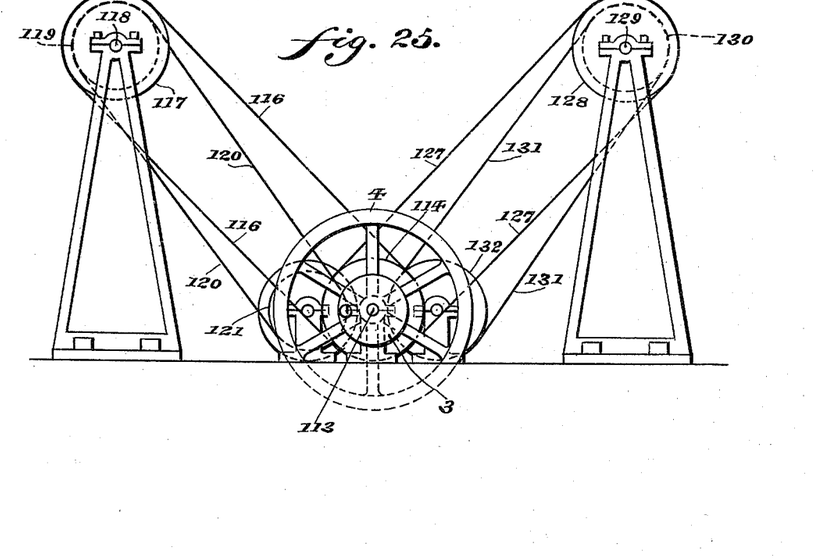
Figs. 25 and 26 represent end elevations of Fig. 24.
Figure 26:
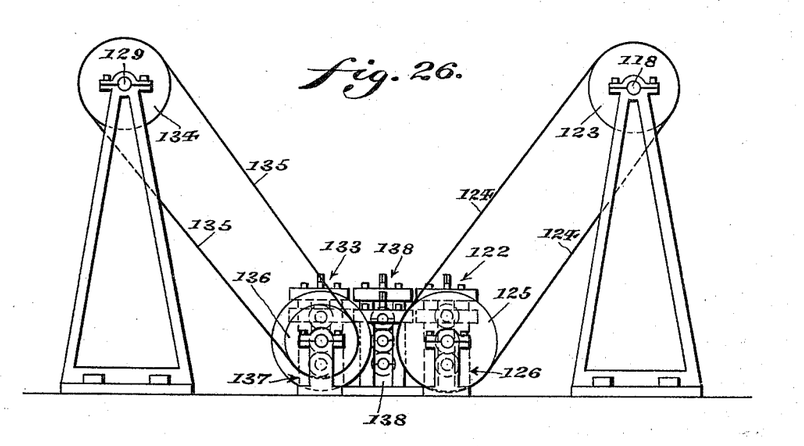
Figure 27:
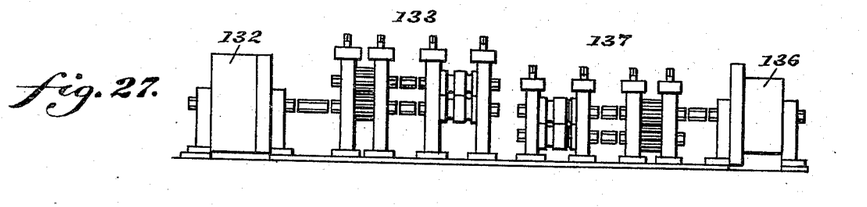
Fig. 27 represents a front elevation of a portion of the mill seen in Fig. 23.
Figure 28:
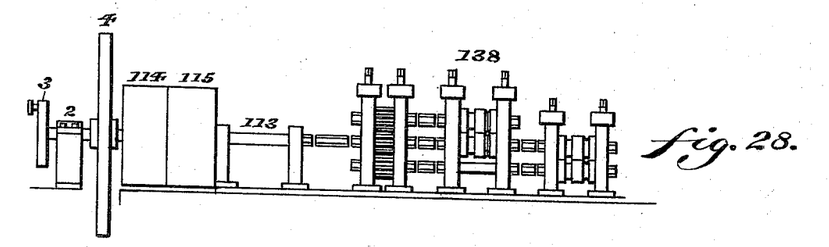
Fig. 28 represents a side elevation of the middle or intermediate mechanism seen in Fig. 23.
Figure 29:
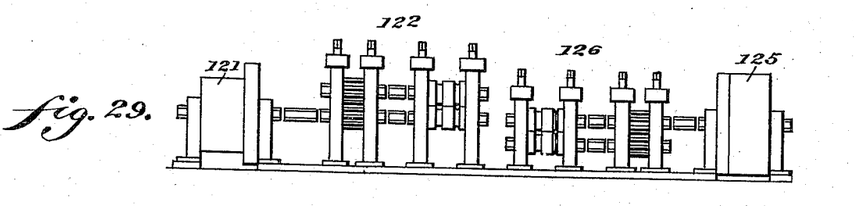
Fig. 29 represents a rear elevation of Fig. 23 similar to Fig. 24 with portions of the belting removed.

In the plan view seen in Fig. 23, 112 designates the parts of the mill in assembled position.

113 designates a main shaft, to which power may be initially applied by means of the crank-disk 3 or other suitable means, said main shaft revolving in suitable bearings 2 and being provided with a fly-wheel 4, as has already been described.

114 and 115 designate pulleys mounted upon the main shaft 113, said pulley 114 having a belt 116 passing therearound by means of which power is transmitted to the pulley 117, which is mounted on the shaft 118, which latter runs in suitable bearings.

119 designates a pulley mounted on the shaft 118, around which passes the belt 120, by means of which power is transmitted to the pulley 121, which, it will be evident, takes the place of the gear 85, (seen in Fig. 1,) thereby actuating that portion of 122 of the apparatus which corresponds to the portion of the apparatus seen at the left of Fig. 4. In like manner the portion 126 of the apparatus seen in Fig. 23 corresponds to the apparatus seen at the right of Fig. 4, said apparatus 126 being actuated by means of the pulley 125, around which passes the belt 124, which is actuated by means of the pulley 123, mounted on the shaft 118.

127 designates a belt which passes around the pulley 115 and actuates the pulley 128, which is mounted on the shaft 129.

130 designates another pulley mounted on the shaft 129, around which passes the belt 131, which actuates the pulley 132 and also the portion 133 of the mill.

134 designates a pulley around which passes a belt 135, which actuates the pulley 136, by which power is transmitted to the portion 137 of the mill which corresponds to that portion of the mill seen at the right of Fig. 2.

The intermediate portion 138 of the apparatus is actuated directly by means of the main shaft 113 in substantially the same manner as is the intermediate portion of the apparatus seen in the plan view in Fig. 1 and in the side elevation in Fig. 3.

The operation of the parts seen in Figs. 23 to 29, inclusive, need not be described in detail, since their operation is substantially identical with the foregoing figures of the drawings, as stated, the direction of rotation of the sets of rolls being the same as seen in Figs. 7 to 10, inclusive, and it being of course understood that the speed of rotation is varied as the cross-sectional area of the billet decreases after each pass.

It will of course be evident that various changes may be made by those skilled in the art which will come within the spirit of my invention, and I do not therefore desire to be restricted in every instance to the exact structure and manner of assembling the above parts which I have herein shown and described.

It will of course be understood that while I have described the parts 6 $9^\times$ 13 21 23, &c., as "couplings" they are in reality spindles with which the coupling-boxes engage, the latter being constructed in the usual manner and being omitted from the drawings for the sake of clearness of illustration.

The coupling-boxes are substantially equal to the length of the spindle and fit the same easily, said boxes being separated and one half of one of the couplings engaging the journal or neck of the roll and the spindle adjacent thereto, while the other half of said coupling engages the opposite end of the same spindle and the neck or journal of the adjacent roll.

Having thus described my invention, what I claim as new, and desire to secure by Letters Patent, is—

1. In a rolling-mill, a main shaft, rolls 10 and 14 actuated thereby, rolls 27 and 20 located in proximity to said rolls 10 and 14 respectively, rolls 62 and 56, 41 and 47 arranged in pairs in front of said rolls 27 and 14, rolls 97, 91 and 82, 78 arranged in pairs in the rear of said rolls 27 and 14, and means for actuating the above rolls.

2. In a rolling-mill, a main shaft, the rolls 10 and 14 actuated thereby, and provided with the grooves 11, 12 and 16, 17 respectively, a roll 27 arranged in proximity to said roll 10 and having the grooves 28 and 29 therein, a roll 20 arranged in proximity to said roll 14 and having the grooves 18 and 19 therein, rolls 62 and 56 having grooves therein and located in front of said rolls 27 and 10, rolls 41 and 47 having grooves therein and located in front of said rolls 14 and 20, rolls 97 and 91 having grooves therein and located back of said rolls 27 and 10 rolls 82 and 78, having grooves therein and located back of said rolls 14 and 20, and means for actuating said rolls.

3. In a rolling-mill, a main shaft, rolls 10 and 14 in alinement therewith and actuated thereby, rolls 27 and 20 located above and below said rolls 10 and 14 respectively, rolls 62 and 56, 41 and 47 in advance of said rolls 27 and 14, rolls 97 and 91, and 82 and 78 in the rear of said rolls 27 and 14, means for actuating said rolls and means for imparting to said rolls different variations of speed, substantially as described.

4. A main shaft 1, having the gear 5 mounted thereon, a gear 8 actuated from said main shaft, gears 25 and 24 in mesh therewith, sets of rolls 27, 10 and 14, 20 actuated by said gears 25, 8 and 24, gears 30 and 50 adapted to intermesh, the gear 53 actuated from said gear 50, the gear 64 in mesh therewith, rolls 62 and 56 actuated by said gears 64 and 53, the shaft 31 upon which said gear 30 is mounted, a gear 34 mounted on said shaft 31, a gear 35 having suitable bearings and meshing with said gear 34, a gear 38 actuated by said gear 35, a gear 49 in mesh with said gear 38, rolls 41 and 47 actuated by said gears 38 and 49, gears 65, 85 suitably supported and in mesh with each other, the gear 88 actuated by said gear 85 and in mesh with the gear 99, the rolls 91 and 97 actuated by said gears 88 and 99, a shaft 66 upon which said gear 65 is mounted, said shaft carrying also the gear 69, the gear 70 in mesh with said gear 69, the gear 73 actuated by said gear 70, the gear 75 in mesh with said gear 73 and rolls 82, 78 actuated by said gears 73 and 75, substantially as described.

JOHN R. JONES.

Witnesses:
   H. R. LUKENS,
   THOS. J. GOVOGHAN.